United States Patent
Sasaki

(10) Patent No.: US 6,243,136 B1
(45) Date of Patent: *Jun. 5, 2001

(54) IMAGE INPUT DEVICE AND IMAGE INPUT SYSTEM WHICH CONTROLS TIMING OF SUCCESSIVE IMAGING OPERATIONS

(75) Inventor: Saburo Sasaki, Tokyo (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/942,392

(22) Filed: Oct. 10, 1997

(30) Foreign Application Priority Data

Oct. 14, 1996 (JP) .................................................. 8-271133

(51) Int. Cl.⁷ ...................................................... H04N 5/238
(52) U.S. Cl. .......................... 348/362; 348/230; 348/296; 348/297; 348/363
(58) Field of Search .................................. 348/208, 296, 348/219, 229, 230, 207, 363, 362, 297, 298, 299

(56) References Cited

U.S. PATENT DOCUMENTS

| | | | |
|---|---|---|---|
| 4,918,533 | * 4/1990 | Date et al. | 348/230 |
| 5,075,775 | * 12/1991 | Kawaoka et al. | 348/364 |
| 5,140,426 | * 8/1992 | Oda | 359/265 |
| 5,153,783 | * 10/1992 | Tamada et al. | 358/906 |
| 5,416,517 | * 5/1995 | Tani et al. | 348/363 |
| 5,471,242 | * 11/1995 | Kondo | 348/362 |
| 5,517,243 | * 5/1996 | Kudo et al. | 348/296 |
| 5,625,411 | * 4/1997 | Inuiya et al. | 348/296 |
| 5,828,407 | * 10/1998 | Suzuki | 348/363 |
| 5,847,756 | * 12/1998 | Iura et al. | 348/363 |
| 5,889,553 | * 3/1999 | Kino et al. | 348/208 |
| 5,969,757 | * 10/1999 | Okada et al. | 348/219 |

* cited by examiner

Primary Examiner—Wendy R. Garber
Assistant Examiner—Mitchell White
(74) Attorney, Agent, or Firm—Oblon, Spivak, McClelland, Maier & Neustadt, P.C.

(57) ABSTRACT

A system controller controls, when successive operations for imaging are to be executed, the second operation for imaging at the timing when the image data obtained in the first operation for imaging is read out from the imaging element, and controls, after start of the second operation for imaging, the light-shuttering operation at the timing earlier than the timing when the image data obtained in the second operation for imaging is read out from the imaging element, and shutters the light to the imaging element with the optical mechanism, so that the control of the second operation for imaging is immediately executed at the timing when the image data obtained in the first operation for imaging is read out without any restriction by the timing when image data is read out from the imaging element.

19 Claims, 14 Drawing Sheets

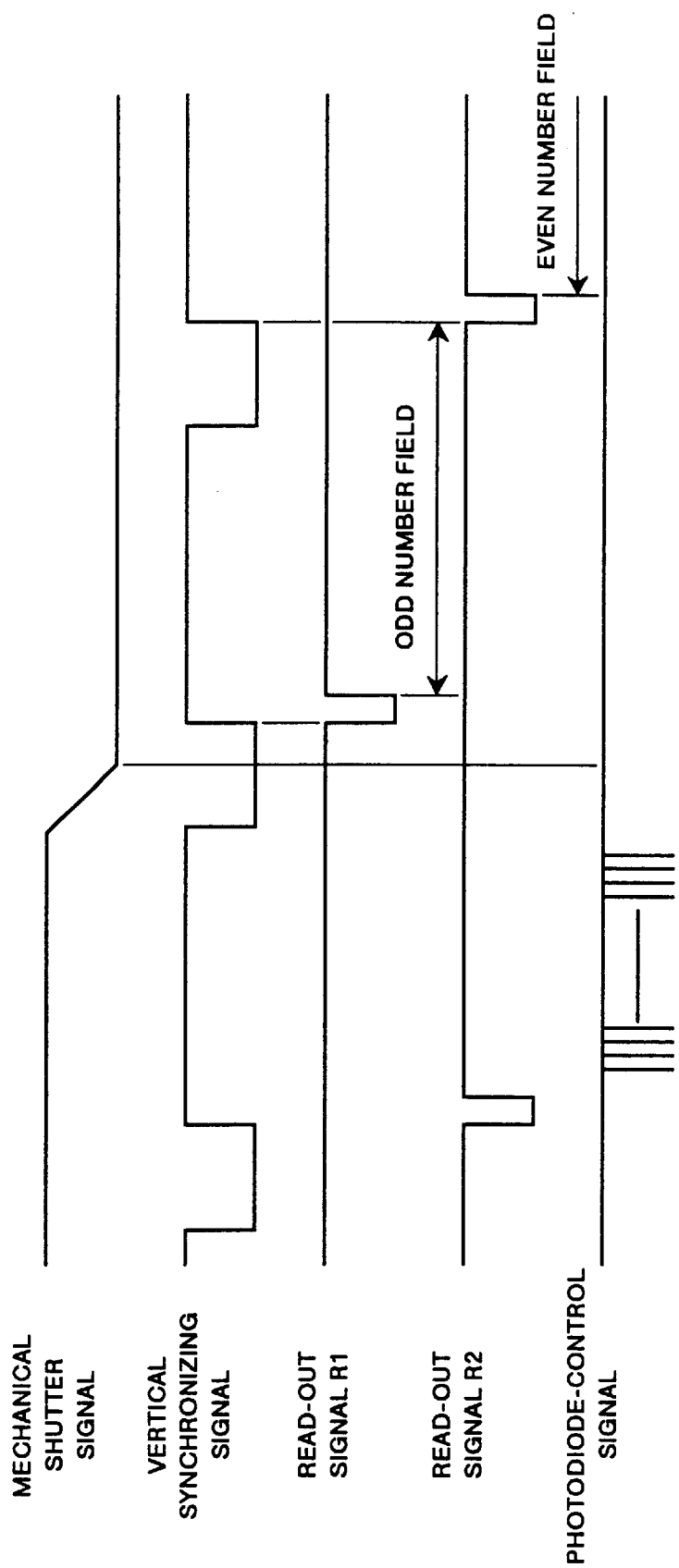

IMAGE INPUT DEVICE AND IMAGE INPUT SYSTEM WHICH CONTROLS TIMING OF SUCCESSIVE IMAGING OPERATIONS

FIELD OF THE INVENTION

The present invention relates to an image input device, and more particularly to an image input device such as a digital still camera and a digital video camera receiving image data obtained by imaging an object using a solid imaging element such as a CCD (Charge Coupled Device) imaging element as well as to an image input system with a computer connected to the image input device for executing the processing of operation for imaging.

BACKGROUND OF THE INVENTION

In the image input device and image input system as described above, for executing successive operations for imaging, it is necessary to read out image data and to store the read out data in a memory for each exposure, so that the time required to read out the data is different according to the number of pixels in a solid imaging element.

Especially, as a large number of pixels are set in a solid imaging element when a high-resolution image is to be obtained, a long time is required for reading out the data. And for this reason, in recent years, there has been proposed the pixel shift technique for achieving a higher resolution image with a smaller number of pixels.

Description is made herein of a conventional method of making a high resolution image. FIG. 13 is a timing chart for explaining a timing for pixel shift in an example based on the conventional technology, and FIG. 14 is a timing chart for explaining the pixel offset and a timing when an operation for imaging is executed in an enlarged dynamic range in an example based on the conventional technology.

At the timing for executing pixel shift shown in FIG. 13, a time for reading (TR) required for reading out image data from a CCD imaging element is set in a range, for instance, from 1/60 to 1/15 seconds, so that a time interval for releasing an electric shutter under the condition in which an exposure time in the first operation and in the second operation is set to a constant period of time, namely a time interval between timings each when an operation for reading out image data is started is obtained by adding a time for pixel shift (TS) to a time for reading (TR). The time for pixel shift (TS) is effected after the time (TF) for transferring charges from the photodiodes to the vertical CCD.

At the timing for executing pixel shift and an operation for imaging in an enlarged dynamic range shown in FIG. 14, a time interval between timings each when an operation for reading out image data is started is the same as that shown in FIG. 13, but by making an exposure time in the second operation for exposure (E2) different from that in the first operation for exposure (E1) (for instance, E1<E2) for executing operations for imaging, the second image data can be used for some pixels which are out of a range to be exposed within a screen used in the first operation for imaging when the pixels are in an appropriate range in a screen used for the second operation for imaging. And for this reason, an image in a wide and dynamic range with a higher resolution can be obtained.

Further, description is made also of a method of obtaining a high resolution image when an all-pixels read-out type of CCD imaging element is not used. FIG. 15 is a timing chart showing a timing for reading out all pixels in a field read-out type of CCD imaging element according to an example based on the conventional technology.

In this example, in order to read out all pixels using the field read-out type of imaging element, a shutter mechanism which is an optical light-shuttering mechanism is used. At the timing shown in FIG. 15, the shutter mechanism is driven at the timing of generation of a mechanical-shutter signal after execution of the operation for imaging, and light to the CCD imaging element is shut. This light-shuttered state is continued until the operation for reading out the pixels is completed.

The operation for reading out pixels is executed twice in one operation for imaging, image data in an odd number of fields is read out in synchronism to a vertical synchronizing signal according to generation of a read-out signal R1 in a first operation for reading out pixels, and image data in an even number of fields is read out in synchronism to the vertical synchronizing signal according to generation of a read-out signal R2 in a second operation for reading out pixels.

It should be noted that a photodiode-control signal is generated after the read-out signals are outputted to remove electric charge accumulated in photodiodes (indicating sections in which a plurality of vertical lines are shown on the photodiode-control signal in FIG. 15). After the electric charge is removed from the photodiodes by means of this photodiode-control signal, the electronic shutter is actuated for exposure.

As described above, in the image input device and the image input system according to the example based on the conventional technology, the electronic shutter can be released to execute operations for imaging only at a time interval between the timings when the operation for reading out image data is started, which makes the device and the system inappropriate for imaging a dynamic object which requires high-speed successive operations for imaging and for imaging an object by a camera held in photographer's hands because these operations must be executed in consideration for shaking of the camera, and for this reason, imaging with the conventional device and system is limited to operations for imaging a still image of a static object, which does not allow full use of the imaging capability.

Nowadays, it has been proposed to use a plurality of sheets of CCD imaging elements and a prism for obtaining a high quality image without any time loss, but in that case the configuration is larger and complicated, and the cost is expensive, which is disadvantageous.

SUMMARY OF THE INVENTION

It is a first object of the present invention to obtain an image input device which can image high quality images regardless of the imaging conditions.

It is a second object of the present invention to obtain an image input device which can image high quality images regardless of the imaging conditions even it is a compact and at a low price.

It is a third object of the present invention to obtain an image input system which can image high quality images regardless of the imaging conditions for any image input device.

It is a fourth object of the present invention to obtain an image input system which can image high quality images regardless of the imaging conditions even if the image input device is compact and at a low price.

With the image input device according to the present invention, when the successive operations for imaging are to be executed, the second operation for imaging is controlled at the timing when the image data obtained in the first operation for imaging is read out from the imaging element, and after start of the second operation for imaging, the light-shuttering operation is controlled at the timing earlier than the timing when the image data obtained in the second operation for imaging is read out from the imaging element, and the light is shuttered to the imaging element with the optical mechanism, so that the control of the second operation for imaging is immediately executed at the timing when the image data obtained in the first operation for imaging is read out without being restricted by the timing when image data is read out from the imaging element.

As a result, time intervals between timings when operations for imaging are executed are reduced and successive operations for imaging are executed at a higher speed, so that imaging conditions are not restricted to an operation for imaging a static object, and operations for imaging a dynamic object and also imaging an object with a camera held in a cameraman's hands can be performed.

With the image input device according to the present invention, when the successive operations for imaging are to be executed, the change of the imaging range is controlled after the first operation for imaging, the second operation for imaging is controlled at the timing when the image data obtained in the first operation for imaging is read out from the imaging element, and after start of the second operation for imaging, the light-shuttering operation is controlled at the timing earlier than the timing when the image data obtained in the second operation for imaging is read out from the imaging element, and the light is shuttered to the imaging element with the optical mechanism, so that control of the second operation for imaging is immediately executed at the timing when the image data obtained in the first operation for imaging is read out without any restriction by the timing when image data is read out from the imaging element, and in that case, a different imaging range can be employed between the first and second operations for imaging.

As a result, the time intervals between imaging timings are reduced and the successive operations for imaging are executed at a higher speed, so that operations for imaging a dynamic object and also imaging an object with a camera held in a photographer's hands can be performed without being restricted by any imaging conditions, and a plurality sheets of image data in different imaging ranges can be obtained by successively imaging the identical object, and for this reason, the invention is quite effective for obtaining a high resolution image by making use of displacement in pixel pitch.

With the image input device according to the present invention, when the successive operations for imaging are to be executed, the second operation for imaging is controlled at the timing when the first image data obtained in the first operation for imaging is read out from the imaging element, and after start of the second operation for imaging, the light-shuttering operation is controlled at the timing earlier than the timing when the second image data obtained in the second operation for imaging is read out from the imaging element, and the first and second image data are read out and stored at each timing when each of the data is read out respectively, and then the first and second image data are synthesized, so that control of the second operation for imaging is immediately executed at the timing when the image data obtained in the first operation for imaging is read out without any restriction by the timing when image data is read out from the imaging element, and image data for one sheet of image can also be obtained on the device by synthesizing the first and second image data.

As a result, the time intervals between imaging timings are reduced and the successive operations for imaging are executed at a higher speed, so that operations for imaging a dynamic object and also imaging an object by a camera held in a photographer's hands can be performed without being restricted by any imaging conditions, and a sheet of an image is obtained from the synthesis of the plurality of sheets of images obtained by successively imaging the identical object, which makes it possible to obtain high resolution images.

With the image input device according to the present invention, when the successive operations for imaging are to be executed, the operation for changing the imaging range is controlled after the first operation for imaging, the second operation for imaging is controlled at the timing when the image data obtained in the first operation for imaging is read out from the imaging element, and after start of the second operation for imaging, the light-shuttering operation is controlled at the timing earlier than the timing when the image data obtained in the second operation for imaging is read out from the imaging element, the first and second image data are read out and stored at each timing when each of the data is read out respectively, and then the first and second image data are synthesized, so that the control of the second operation for imaging is immediately executed at the timing when the image data obtained in the first operation for imaging is read out without being restricted by the timing when image data is read out from the imaging element, and image data for one sheet of image can also be obtained on the device by synthesizing the first and second image data each in a different imaging range.

As a result, the time intervals between imaging timings are reduced and the successive operations for imaging are executed at a higher speed, so that operations for imaging a dynamic object and also imaging an object by a camera held in a cameraman's hands can be performed without being restricted by the imaging conditions, and image data for a plurality of sheets of images each in a different imaging range is obtained by successively imaging the identical object, which makes it possible to obtain high resolution images by making use of displacement in pixel pitch.

With the image input system according to the present invention, in the image input device, when the successive operations for imaging are to be executed, the second operation for imaging is controlled at the timing when the first image data obtained in the first operation for imaging is read out from the imaging element, and after start of the second operation for imaging, the light-shuttering operation is controlled at the timing earlier than the timing when the second image data obtained in the second operation for imaging is read out from the imaging element, while in the computer, the first and second image data are received from the image input device to be synthesized, so that the control of the second operation for imaging is immediately executed at the timing when the image data obtained in the first operation for imaging is read out without being restricted by the timing when image data is read out from the imaging element, and image data for one sheet of image can also be obtained on the device by synthesizing the first and second image data.

As a result, in the image input device, the time intervals between imaging timings are reduced and the successive operations for imaging are executed at a higher speed, so that operations for imaging a dynamic object and also imaging an object by a camera held in a photographer's hands can be performed without being restricted by the imaging conditions, while in the computer, an image for one sheet is obtained from the synthesis of the plurality of sheets of images obtained by successively imaging the identical object, which makes it possible to obtain high resolution images.

With the image input system according to the present invention, in the image input device, when the successive operations for imaging are to be executed, the operation for changing the imaging range is controlled after the first operation for imaging, the second operation for imaging is controlled at the timing when the image data obtained in the first operation for imaging is read out from the imaging element, and after start of the second operation for imaging, the light-shuttering operation is controlled at the timing earlier than the timing when the image data obtained in the second operation for imaging is read out from the imaging element, and the light is shuttered to the imaging element with the optical mechanism, while in the computer, the first and second image data are received from the image input device to be synthesized, so that the control of the second operation for imaging is immediately executed at the timing when the image data obtained in the first operation for imaging is read out without any restriction by the timing when image data is read out from the imaging element, and image data for one sheet of image can also be obtained on the device by synthesizing the first and second image data each in a different imaging range.

As a result, in the image input device, the time intervals between imaging timings are reduced and the successive operations for imaging are executed at a higher speed, so that operations for imaging a dynamic object and also imaging an object by a camera held in photographer's hands can be performed without being restricted by the imaging conditions, while in the computer, an image for one sheet is obtained by means of synthesis of images each in a different imaging range obtained by successively imaging the identical object, which makes it possible to obtain high resolution images by making use of displacement in pixel pitch.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 15 is a timing chart showing timing for reading out all pixels in a field read-out type of the imaging element according to an example based on the conventional technology.

DESCRIPTION OF THE PREFERRED EMBODIMENT

Detailed description is made hereinafter for preferred embodiments of the present invention with reference to the attached drawings.

Figure 1:
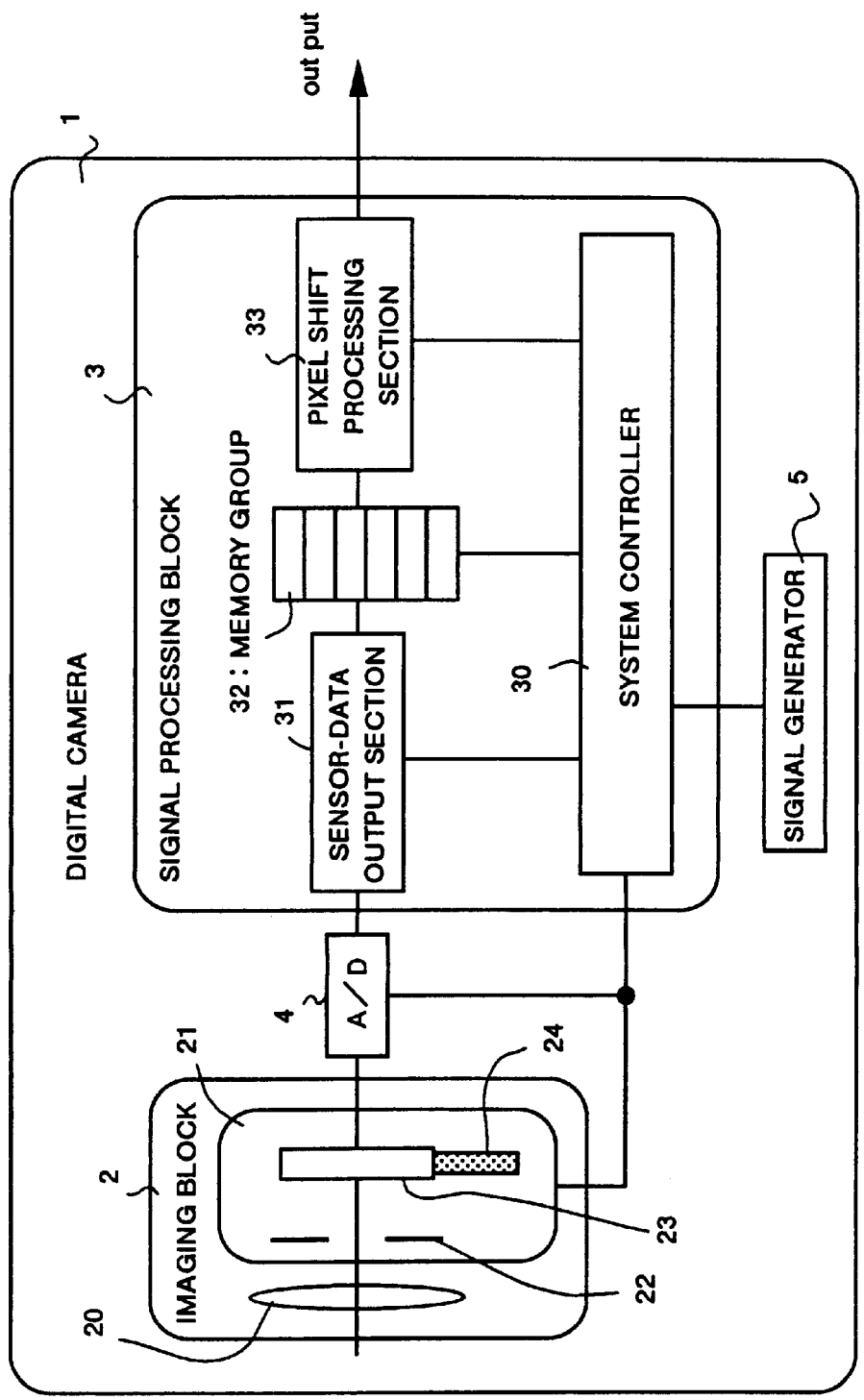
FIG. 1 is a block diagram showing one embodiment (Embodiment 1) of the image input device according to the present invention.

FIG. 1 is a block diagram showing one embodiment (Embodiment 1) of the image input device according to the present invention, and FIG. 1, the reference numeral 1 indicates a digital still camera (described as a digital camera hereinafter) which is one of examples of the image input device.

The digital camera 1 shown in FIG. 1 comprises, by roughly classifying the main configuration thereof, an imaging block 2 for executing an operation for imaging an object to obtain analog image data, and a signal processing block 3 for processing digital image data having digitalized the analog image data obtained in the imaging block 2 and outputting the processed data to an external device.

Provided in this digital camera 1 is an A/D converting section 4 for converting image data from analog to digital in a space between the imaging block 2 and the signal processing block 3, and a signal generator 5 for generating a signal according to an operation of a mode switch or the like which is not shown in the figure and outputting the signal to the signal processing block 3, is connected to the signal processing block 3.

The imaging block 2 comprises an optical lens 20 and an imaging section 21 so that it can move under controls by the signal processing block 3. The imaging section 21 comprises a shutter mechanism 22 for shuttering an incident light into the lens 220 with the optical mechanism, a CCD 23 receiving the light having entered the lens 20, and a piezoelectric element 24 supporting the CCD 23 for executing pixel shift by moving the light-receiving surface of the CCD 23 in parallel to a surface on which an image is formed and changing the imaging range of the identical object. The output terminal of the CCD 23 is connected to the A/D converting section 4.

The signal processing block 3 comprises components such as a system controller 30, a sensor-data output section 31, a memory group 32 comprising a plurality of memories, and a pixel shift processing section 33.

The system controller 30 is connected to each of units such as the imaging section 21 in the imaging block 2, A/D converting section 4, sensor-data output section 31, memory group 32, pixel shift processing section 33, and signal generator 5, and controls an operation for imaging, A/D conversion, read/write for the memory, pixel shift, and operations according to key-entry or the like.

Figure 6:
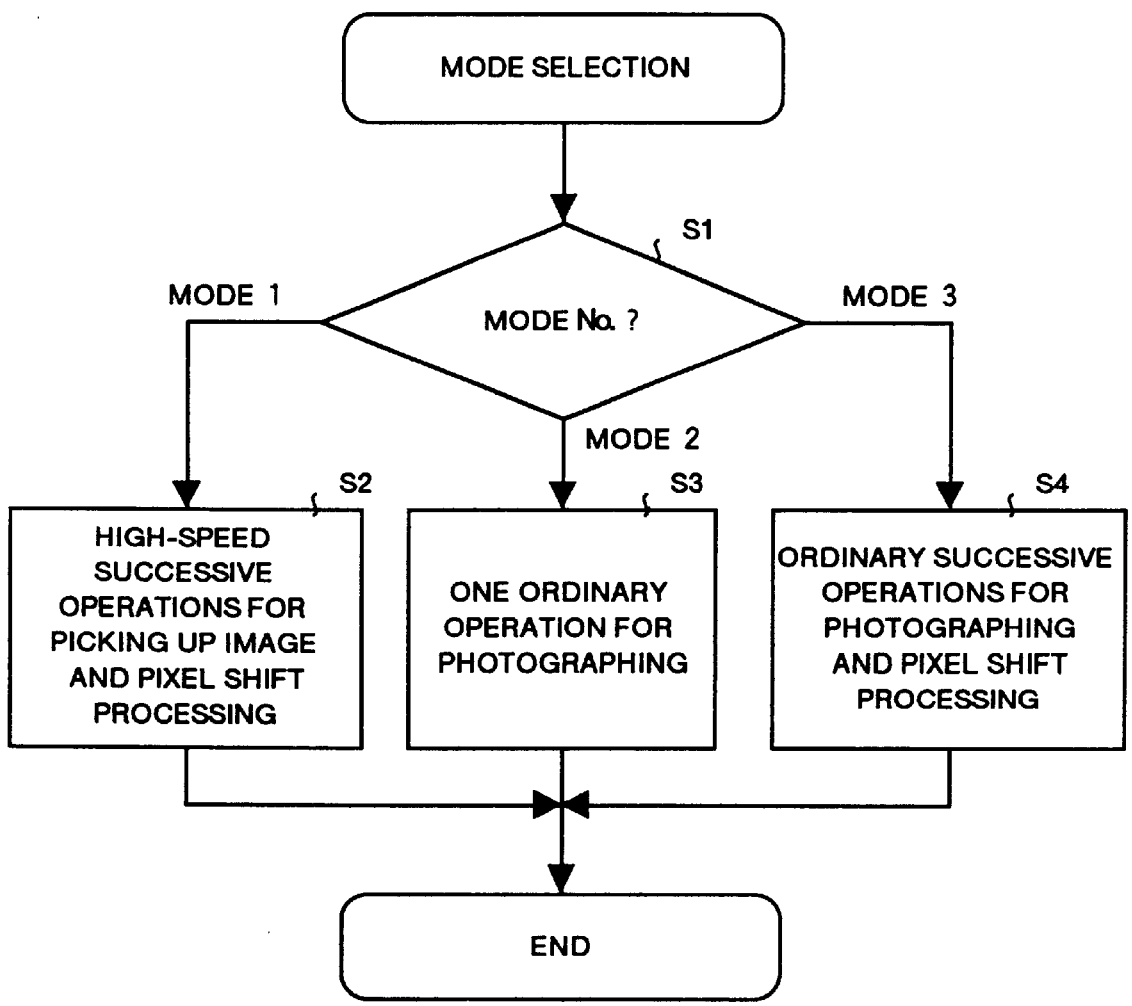
FIG. 6 is a flowchart for explaining the processing for mode selection according to Embodiment 1.
Figure 7:
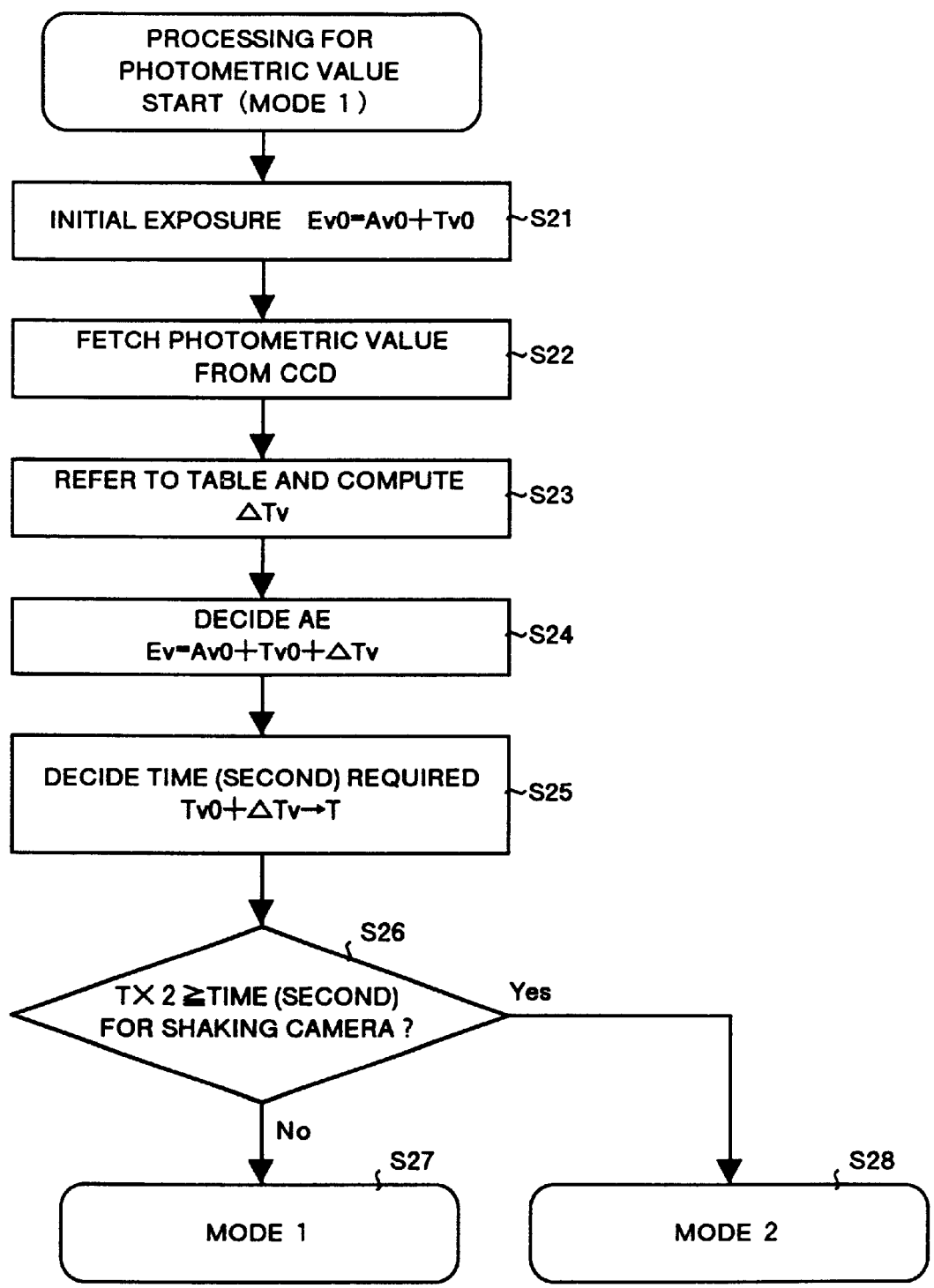
FIG. 7 is a flowchart for explaining the processing for a photometric value according to Embodiment 1.

It should be noted that the system controller 30 comprises a microcomputer or the like, and executes processing for controlling each of the units and computation by actuating the microcomputer according to various programs (e.g. a program for making a computer execute processing according to the flowchart shown in FIG. 6 and FIG. 7) previously stored in a ROM.

The sensor-data output section 31 connected to the output terminal of the A/D converting section 4 receives digital image data and outputs received digital image data to any of the memories in the memory group 32 in the downstream section of the system according to the control provided by the system controller 30.

The memory group 32 has a plurality of memories, uses one memory for each operation for imaging as storage of image data according to the control provided by the system controller 30, reads out digital image data from one of the memories, and supplies the read-out data to the pixel shift processing section 33 provided in the downstream section of the system.

The pixel shift processing section 33 executes the pixel shift processing according to the digital image data supplied from the memory group 32, and more specifically, obtains high resolution images from an identical object according to a pixel shift rate (for instance, ½ pitch in a pixel) when the imaging range is changed by the piezoelectric element 24, and finally obtains image data for one sheet.

The output terminal of this pixel shift processing section 33 is connected to an external terminal which is not shown in the figure, and data can be sent out by being connected to external equipment such as a personal computer.

The signal generator 5 has switches with which an operation for imaging is executed by actuating an electronic shutter or a shutter mechanism 22 and mode switches or the like for setting various modes. For example, the mode switches are provided for three types of modes: Mode 1 to Mode 3.

Mode 1 is a mode used for executing high-speed successive operations for imaging as well as the pixel shift processing (Refer to FIG. 6), Mode 2 is amode used for executing an ordinary operation for imaging (Refer to FIG. 6 described later) in which an operation for imaging is executed only once at an ordinary speed, and Mode 3 is a mode used for executing an ordinary successive operations for imaging as well as the pixel shift processing (Refer to FIG. 6).

Figure 2:
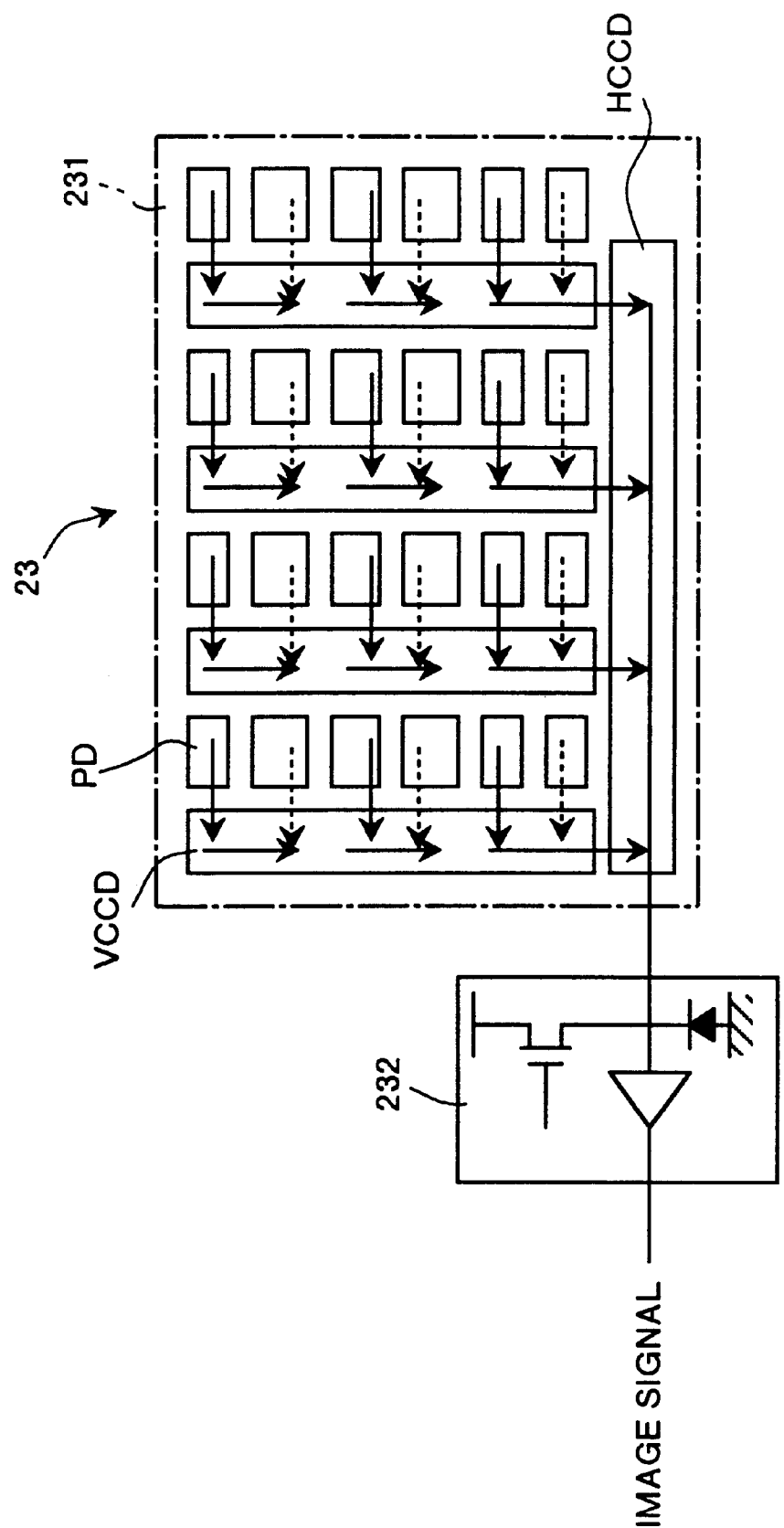
FIG. 2 is a circuit diagram showing an example of configuration of the imaging element according to Embodiment 1.

Next, description is made for the imaging element 23. FIG. 2 is a block diagram showing an example of a configuration of the imaging element 23 in the imaging block 2.

The imaging element 23 has a CCD section 231 and a signal detecting section 232. The CCD section 231 comprises a plurality of photodiodes PD placed in a matrix, a plurality of VCCDs for transferring charges on the photodiodes PD in the vertical direction, and an HCCD for transferring charges on the photodiodes PD in the horizontal direction.

The plurality of photodiodes PD receive an incident light into the optical lens 20 and subject the light to photoelectric transfer to transfer charges to the VCCDs and then to the HCCD. The HCCD outputs the charges transferred from the VCCDs to the signal detecting section 232. The signal detecting section 232 converts the received charges to a voltage and outputs the voltage to the A/D converting section 4 as an image signal (analog image signal). It should be noted that in this Embodiment 1, an all-pixels read-out type of imaging element 23 is used.

Figure 3:
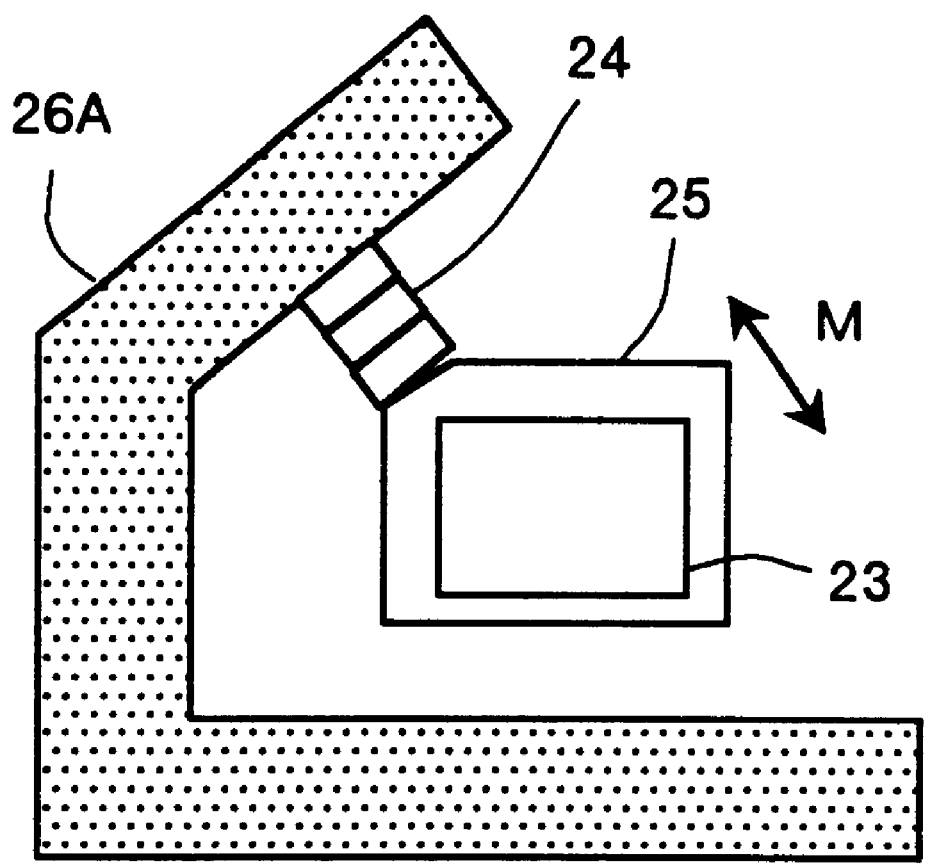
FIG. 3 is a general block diagram showing how the piezoelectric element is attached to other components according to Embodiment 1.

Next, description is made for the piezoelectric element 24. FIG. 3 is a general block diagram showing how the piezoelectric element 24 in the photographic block 2 is attached to other components.

The layered type of piezoelectric element 24 has one edge connected to a board 26A and supports an element holder 25 to which the imaging element 23 is attached with the other edge thereof. The element holder 25 moves in the M direction indicated by the arrow according to actuation of the piezoelectric element 24.

This piezoelectric element 24 executes the operation for changing an imaging range in any of the horizontal, vertical and diagonal directions according to an angle of attachment thereof in the imaging block 2 (an operation for pixel shift in the piezoelectric element 24).

Figure 4:
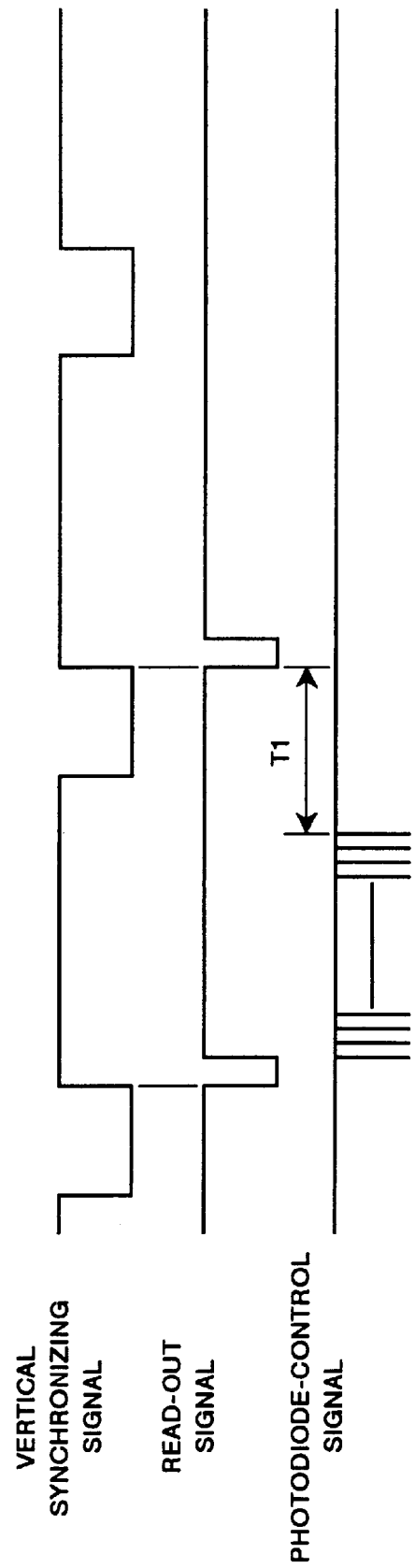
FIG. 4 is a timing chart showing a timing for reading out pixels in the all-pixels read-out type of imaging element according to Embodiment 1.

Next, description is made for operations in Mode 1 to Mode 3. FIG. 4 is a timing chart showing a timing for reading out pixels with the all-pixels read-out type of imaging element, and in FIG. 4, the reference character T1 indicates an exposure time when the electronic shutter is released.

Mode 2 shown in FIG. 4 is a mode in which only the electronic shutter is used but the shutter mechanism 22 is not used. This Mode 2 is suited for imaging an ordinary static object because a preset time interval is employed for successively imaging since a read-out signal for reading out all pixels is generated in synchronism to a vertical synchronizing signal for reading out all pixels.

A photodiode-control signal is generated, to remove charges accumulated in the photodiodes PD (sections, in FIG. 4, in which a plurality of vertical lines are shown on the photodiode-control signal), after the read-out signal is outputted. The electronic shutter is actuated for exposure during the time (exposure time T1) after the charges are removed from the photodiodes PD by this photodiode-control signal until the next read-out signal is generated.

Figure 5:
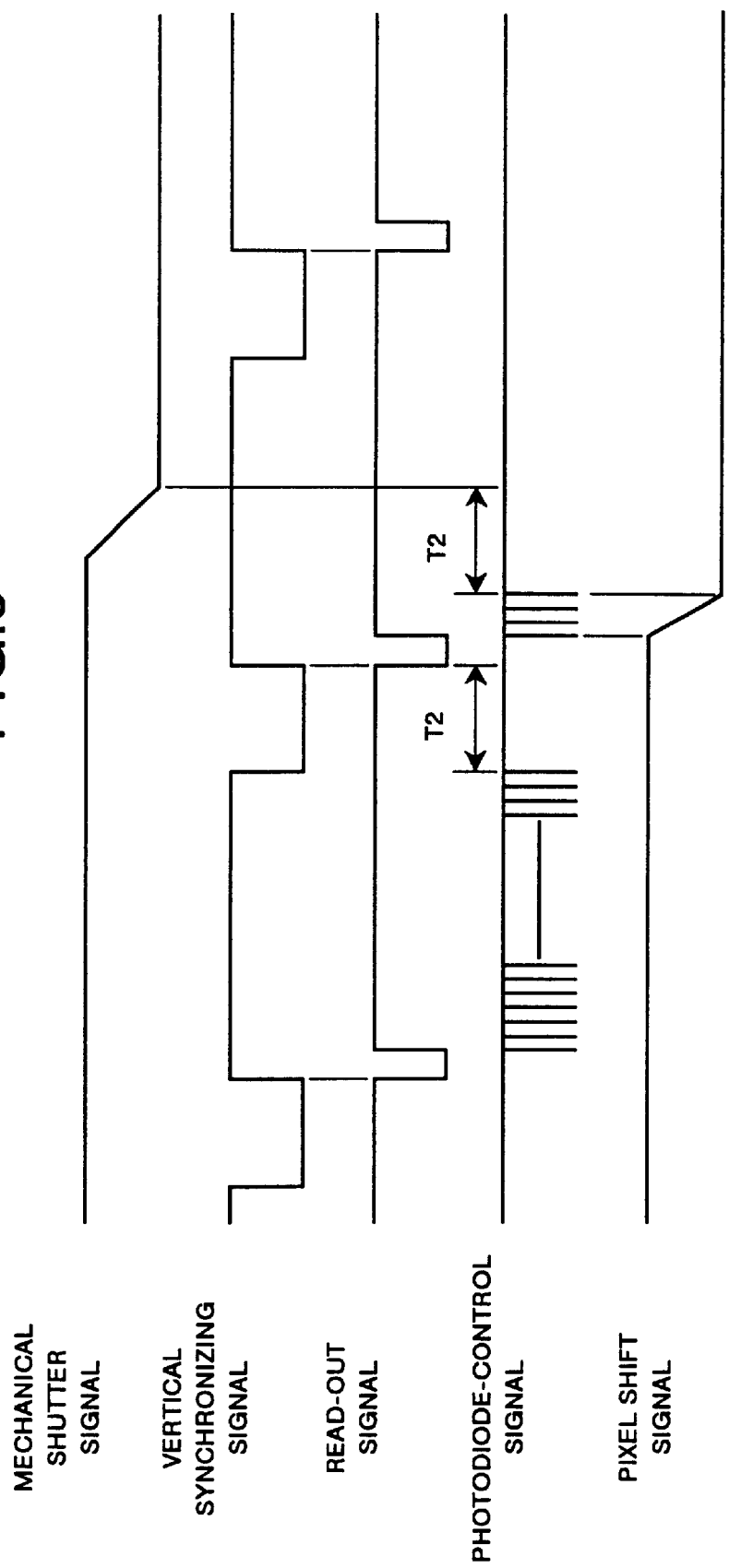
FIG. 5 is a timing chart showing a timing for reading out pixels according to successive operations for high-speed imaging as well as to pixel shift in the all-pixels read-out type of imaging element according to Embodiment 1.

Next, description is made for Mode 1. FIG. 5 is a timing chart showing a timing for reading out pixels according to high-speed successive operations for imaging as well as pixel shift processing in the all-pixels read-out type of imaging element, and in FIG. 5, the reference character T2 indicates an exposure time.

In FIG. 5, a mechanical shutter signal is a control signal for operating the shutter mechanism 22, and a pixel shift signal is a control signal used for shifting a pixel, for example, by ½ pitches by actuating the piezoelectric element 24.

Also in this Mode 2, a read-out signal is generated in synchronism to a vertical synchronizing signal, but in this Mode 2, after the exposure for a first operation for imaging is finished with elapse of the exposure time T2, when a read-out signal is generated, the operation for transmitting the signal is executed in the imaging element 23. A pixel shift signal is generated at the timing for the signal transfer, and an operation for pixel shift in the imaging element 23 is executed at the timing by the piezoelectric element 24. The operation of this pixel shift is completed after the signal transfer.

Also, after this transfer, the image data is written in a memory for the first operation for imaging in the memory group 32 according to the control provided by the system controller 30.

Then, after the operation for pixel shift is completed, exposure for a second operation for imaging is started. In this step, successive operations for imaging are executed at a time interval in a range, for instance, from 12 to 32 msec. Also in this second operation for imaging, the exposure time is indicated by the reference character T2, and the same exposure volume for the same exposure time as that in the first operation can be acquired. A mechanical shutter signal is generated at the timing when the exposure time T2 has passed, and the shutter mechanism 22 is actuated. The light to the imaging element 23 is shuttered with the optical mechanism in this shutter mechanism 22.

The image data obtained in the second operation for imaging is transmitted when the next read-out signal is generated as in the case of the first operation for imaging, and then control is provided so as to write the image data in a memory different from the memory in which the data obtained in the first operation for imaging has been written.

Next, description is made for operations of the system controller 30.

At first, description is made for selection of a mode. FIG. 6 is a flowchart for explaining the processing for mode selection.

In this processing for mode selection, an operation for determining a mode is executed according to an operation signal generated by the signal generator 5 in accordance with an operation of any of mode switches (FIG. 6). Namely, in the system controller 30, when the operation signal is received, a mode number (No.) is determined according to the operation signal (step S1).

If it is determined that the mode No. is "1", the processing shifts to step S2, and processing for high-speed successive operations for imaging and pixel shift processing according to Mode 1 is executed. If it is determined that the mode No. is "2", the processing shifts to step S3, and processing for one ordinary operation for imaging is executed. Also, if it is determined that the mode No. is "3", the processing shifts to step S4, and processing for ordinary successive operations for imaging and pixel shift processing according to Mode 3 is executed.

Figure 8:
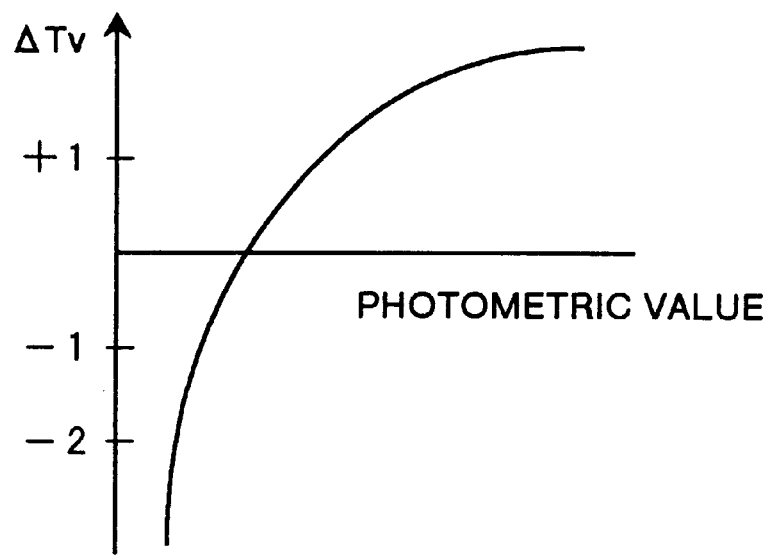
FIG. 8 is a view showing a correlation between a photometric value and an exposure time correction value Δ Tv according to Embodiment 1.

Then, description is made for Mode 1. FIG. 7 is a flowchart for explaining processing for a photometric value performed before Mode 1 is executed, and FIG. 8 is a view showing a correlation between a photometric value and an exposure time correction value $\Delta$ Tv in a graph.

In this processing for a photometric value, at first, initial exposure (Ev0) is obtained by adding an aperture value (Av0) to an exposure value (Tv0) (step S21). A photometric value is fetched by the imaging element 23 (step S22), and a exposure time correction value $\Delta$ Tv is obtained based on the photometric value (step S23).

In this step S23, there is a method for obtaining the value by referring to a table to obtain the exposure time correction value $\Delta$ Tv from the photometric value. The table is created by arranging curve data for the photometric value and exposure time correction value $\Delta$ Tv shown in FIG. 8 so that the photometric value is correlated to the exposure time correction value $\Delta$ Tv, and the created table may be stored in the system controller 30.

In step S24, in order to decide AE (automatic exposure), exposure (Ev) is obtained by means of summing an aperture value (Av0), an exposure value (Tv0), and an exposure time correction value ($\Delta$ Tv), and in step 25, a time (second) required for one operation for imaging is obtained by adding the exposure value (Tv0) to the exposure time correction value ($\Delta$ Tv).

The time until occurrence of shaking of a camera is previously registered the system controller 30 as an allowable time (second) (T) for shaking of a camera. In step S26, if the time (second) (T) for one operation is doubled and the obtained value is smaller than the time (second) for shaking of a camera, the processing in Mode 1 is executed as set by the mode switch in step S27, and if it is determined that the value is larger than the preset value, the operation mode is switched to Mode 2 in step S28, and the processing in Mode 2 is executed.

As described above, with Embodiment 1, when the successive operations for imaging are to be executed, the second operation for imaging is controlled at the timing when the image data obtained in the first operation for imaging is read out from the imaging element 23, and after start of the second operation for imaging, the light-shuttering operation is controlled at the timing earlier than the timing when the image data obtained in the second operation for imaging is read out from the imaging element 23, and the light to the imaging element 23 is shuttered with the shutter mechanism 22, so that the control of the second operation for imaging is immediately executed at the timing when the image data obtained in the first operation for imaging is read out without being restricted by the timing when image data is read out from the imaging element.

As a result, time intervals between timings for operations for imaging are reduced and successive operations for imaging are executed at a higher speed, so that operations for imaging a dynamic object and also imaging an object by a camera held in photographer's hands can be performed without being restricted by imaging conditions.

Also, when the successive operations for imaging are to be executed, the change of the imaging range is controlled after the first operation for imaging, a different imaging range can be employed between the first and second operations for imaging, and with this feature, a plurality sheets of image data in different imaging ranges can be obtained by means of successive operations for imaging, and for this reason, the invention is quite effective in a case where a high resolution image is obtained by making use of shift in pixel pitch.

When the successive operations for imaging are to be executed, the first image data obtained in the first operation for imaging and the second image data obtained in the second operation for imaging are designed to be synthesized to obtain image data for one sheet of image, so that image data for one sheet of image can be obtained on the device by synthesizing the first and second image data, which makes it possible to obtain a sheet of high quality image with image data for a plurality sheets of image obtained by means of successive operations for imaging.

When the successive operations for imaging are to be executed, the operation for changing the imaging range is controlled after the first operation for imaging, the first image data obtained in the first operation for imaging and the second image data obtained in the second operation for imaging are designed to be synthesized to obtain image data for one sheet of image, so that image data for one sheet of image can be obtained on the device by synthesizing the first and second image data each in a different imaging range, and with this feature, image data for a plurality of pieces of images each in a different imaging range is obtained by means of successive operations for imaging, which allows higher resolution of an image to be achieved by using displacement in pitches of pixels.

The operation for pixel shift in the imaging element 23 is executed by changing an imaging range of an object by means of actuating the piezoelectric element 24, so that the structure can be simplified, which makes it possible to obtain a high resolution image without being restricted by imaging condition in any device which is compact and less expensive.

Further, a plurality of modes including Mode 1 used for executing successive operations for high-speed imaging are provided, and determination is made as to whether Mode 1 is to be executed or Mode 2 is to be executed according to a result of comparison between an exposure time obtained based on a photometric value by the imaging element 23 and a preset allowable time in consideration for shaking of a camera, so that Mode 1 is executed if it is determined that the operation for imaging can be executed within the time when shaking of a camera may not occur at the time of imaging, and if it is determined that the operation can not be executed within the time described above, Mode 2 can be selected, and with this feature, it is possible to execute an optimal operation for imaging as required according to any situation at the time of imaging.

In the Embodiment 1, the movement direction (M) of the piezoelectric element 24 includes only one direction, but the direction is not limited to one direction described above, and a plurality of piezoelectric elements may be used so as to be capable of moving in any of vertical and horizontal directions.

Figure 9:
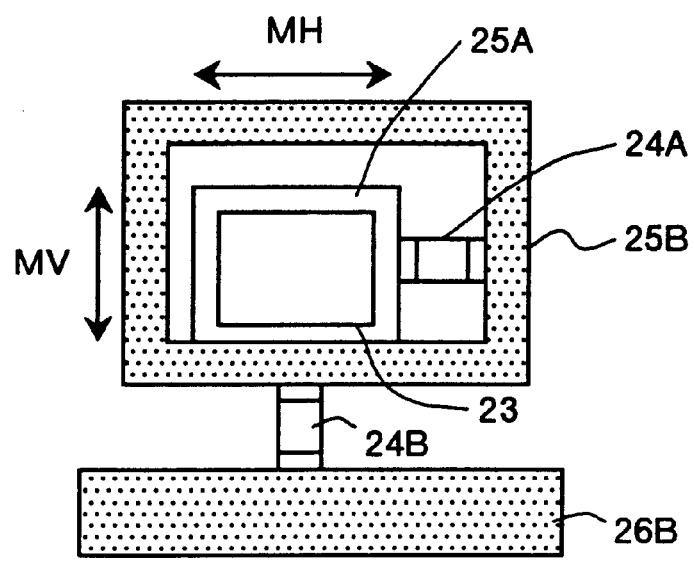
FIG. 9 is a general block diagram showing how the piezoelectric element is attached to other components according to Variant 1 of Embodiment 1.

Description is made hereinafter for Variant 1 of the present invention. FIG. 9 is a general block diagram showing how the piezoelectric element is attached to other components according to Variant 1 of Embodiment 1. In the construction for attachment shown in FIG. 9, two units of piezoelectric element 24A, 24B are used. The piezoelectric element 24A is placed in the horizontal posture to move an element holder 25A of the imaging element 23 in the MH direction indicated by the arrow (horizontal direction), namely, to move an imaging range of the imaging element 23 in the horizontal direction. This piezoelectric element 24A has one edge connected to an internal surface of a holder 25B in which the element holder 25A is accommodated and supports the element holder 25A with the other edge thereof.

The piezoelectric element 24B is placed in the vertical posture to move a holder 25B in the MV direction indicated by the arrow (vertical direction), namely, to move an imaging range of the imaging element 23 in the vertical direction. This piezoelectric element 24B has one edge connected to a board 26B and supports the holder 25B with the other edge thereof.

As described above, the imaging element 23 can be moved both in the horizontal direction and in the vertical direction using a plurality of piezoelectric elements 24A, 24B.

Also, in Embodiment 1, the same exposure time is employed for the first and second operations for imaging, but an exposure timing is not limited to the above time, so that an exposure time in the second operation for imaging can be set to be longer than that in the first operation for imaging.

Figure 10:
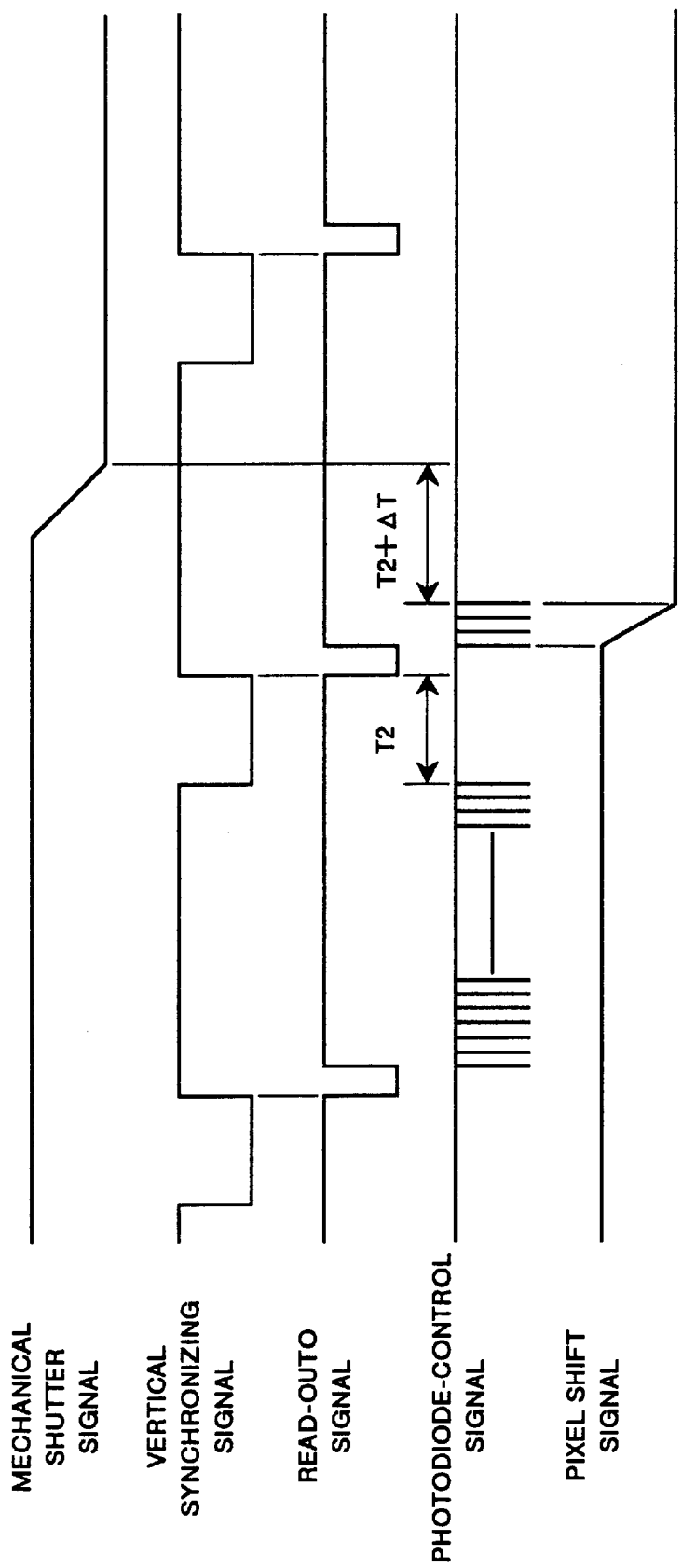
FIG. 10 is a timing chart showing a timing when pixels are read out in operations for imaging executed for a dynamically enlarged exposure time with the all-pixels read-out type of imaging element in Variant 2 of Embodiment 1.

Next, description is made for Variant 2. FIG. 10 is a timing chart showing a timing when pixels are read out in operations for imaging in an enlarged dynamic range with the all-pixels read-out type of imaging element in Variant 2 of Embodiment 1.

A difference from the timing shown in FIG. 5 is that exposure time for a second operation for imaging is T2+Δt. In this case, the exposure time for the second operation is longer than that in the first operation, which allows a much larger exposure volume, as compared to that in the first operation for imaging, in the second operation.

Then, when the exposure time T2+Δt has passed, the mechanical shutter signal is generated at the timing for the second operation for imaging and the shutter mechanism 22 is actuated. The light to the imaging element 23 is shuttered with the optical mechanism of this shutter mechanism 22.

In this Variant 2, the first exposure time T2 is decided according to the control for closing the electronic shutter, while the second exposure time T2+Δt is decided according to control for closing the shutter mechanism 22, so that generation of the mechanical shutter signal indicating the control to close the mechanism may be controlled after a delay of Δt in addition to the first exposure time T2.

As described above, an exposure time between the first operation for imaging and the second operation for imaging is varied, so that a plurality of sheets of images each having a different exposure volume can be obtained by imaging an identical object several times, and it is possible to obtain a high quality image with high resolution as well as with a widely dynamic range by synthesizing the plurality of sheets of images.

In Embodiment 1, description was made for a case where an all-pixels read-out type of imaging element 23 is used, but a read-out type is not limited to the all-pixels read-out type, and the operation for reading out all pixels may be executed using a field read-out type of imaging element.

Figure 11:
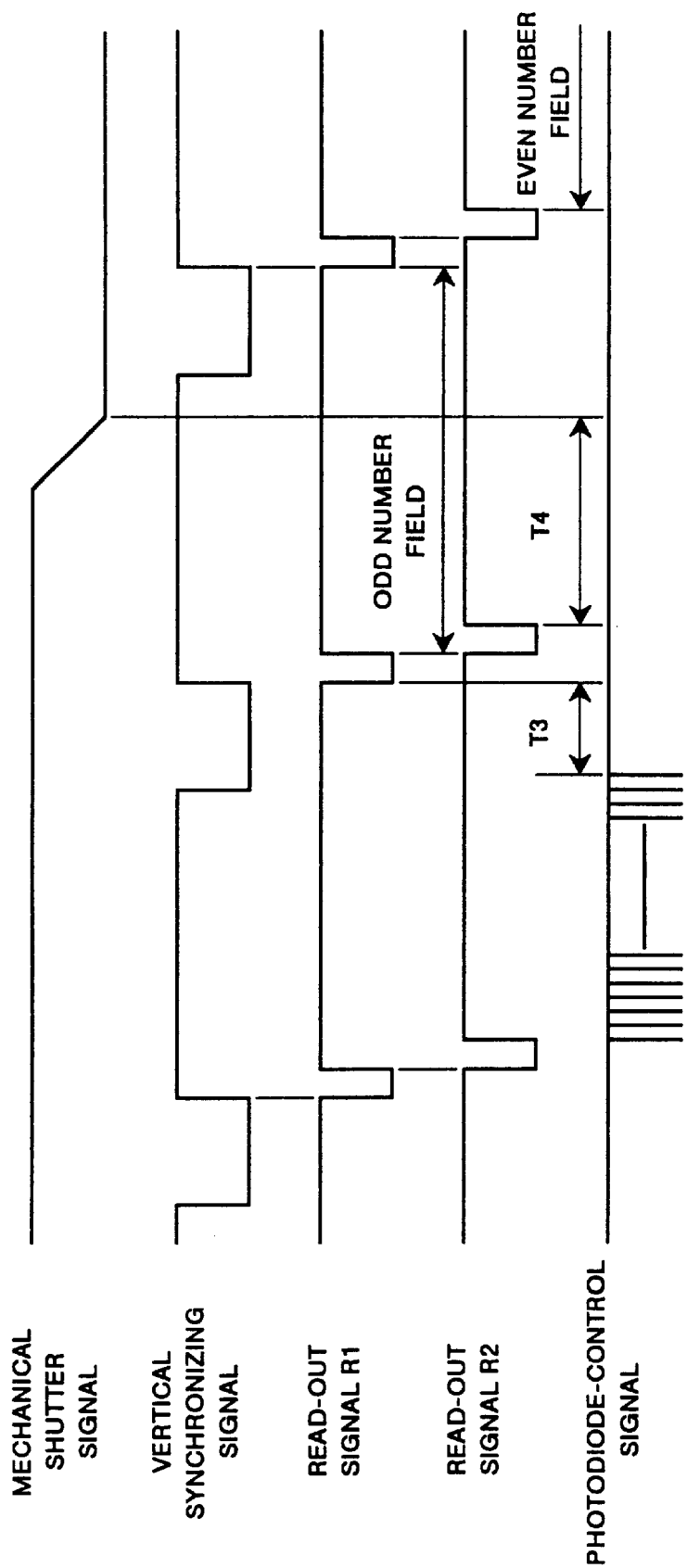
FIG. 11 is a timing chart showing a timing when pixels are read out in operations for imaging an object in an enlarged dynamic range with the field read-out type of imaging element in Variant 3 of Embodiment 1.

Next, description is made for Variant 3. FIG. 11 is a timing chart showing a timing when pixels are read out in operations for imaging an object in an enlarged dynamic range with the field read-out type of imaging element in Variant 3 of Embodiment 1.

In the mode for high-speed successive operations for imaging, in the operation for reading out all pixels with this field read-out type of imaging element, image data for odd number fields is read out upon generation of a read-out signal R1, as described in the example based on the conventional technology (Refer to FIG. 15), and image data for even number fields is read out upon generation of a read-out signal R2. In the operations for reading out pixels in each of the fields, pixel mixing is executed.

As shown in FIG. 11, exposure for each field (odd number fields and even number fields) is executed twice in accordance with generation of aphotodiode control signal, and in this case, control is provided for generation of a mechanical shutter signal so that a second exposure time T4 is set to be longer than a first exposure time T3.

As described above, exposure is executed for each field twice, and an exposure time is set to be different between the first exposure (exposure time T3) and the second exposure (exposure time T4), which allows a widely dynamic image to be obtained using the field read-out type of imaging element without using the all-pixels read-out type of imaging element.

In Embodiment 1, the processing for pixel shift is executed in a digital camera 1, but as Embodiment 2 described below, the processing for pixel shift may be executed by external equipment.

Figure 12:
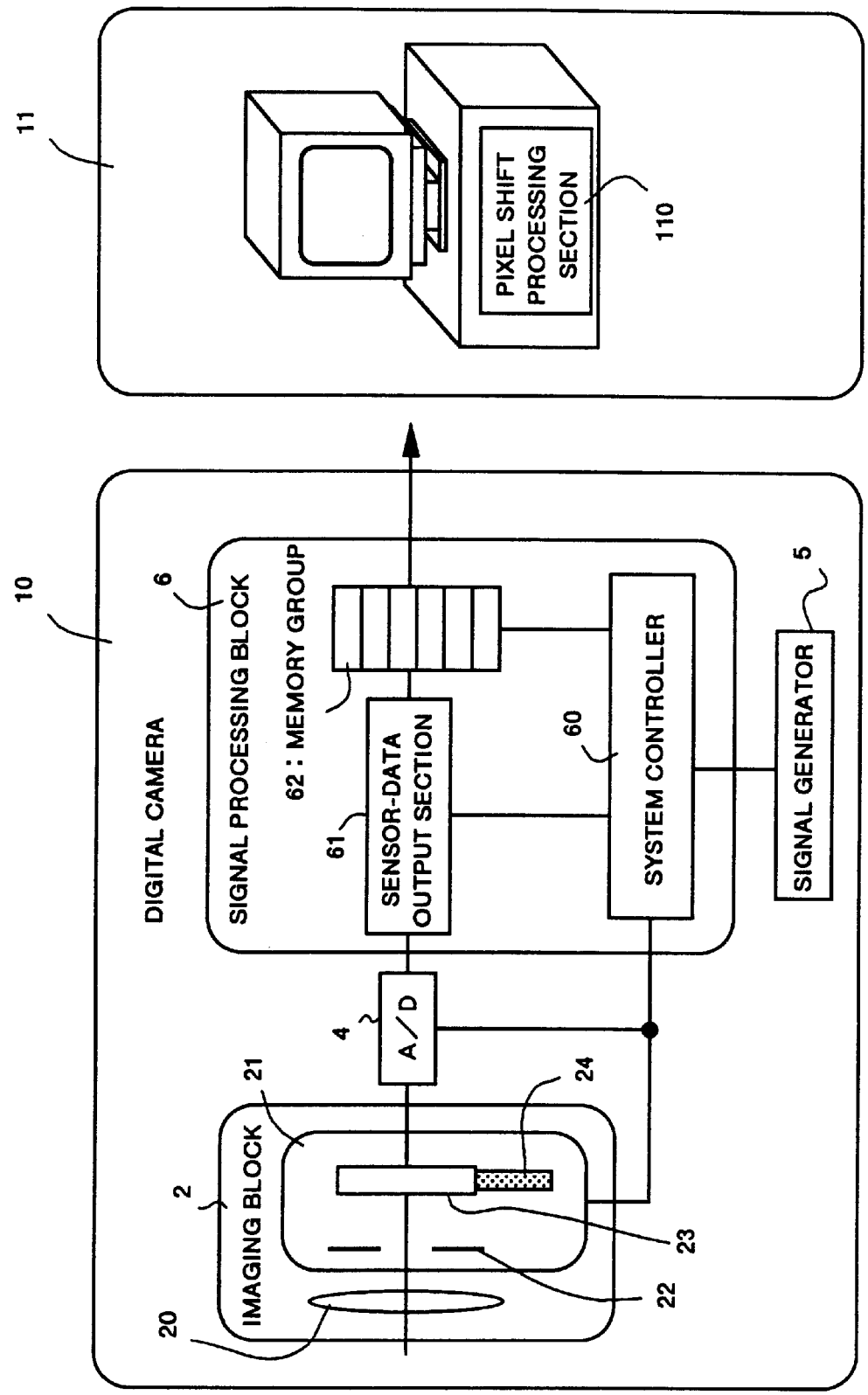
FIG. 12 is a block diagram showing one embodiment (Embodiment 2) of the image input system according to the present invention.
Figure 13:
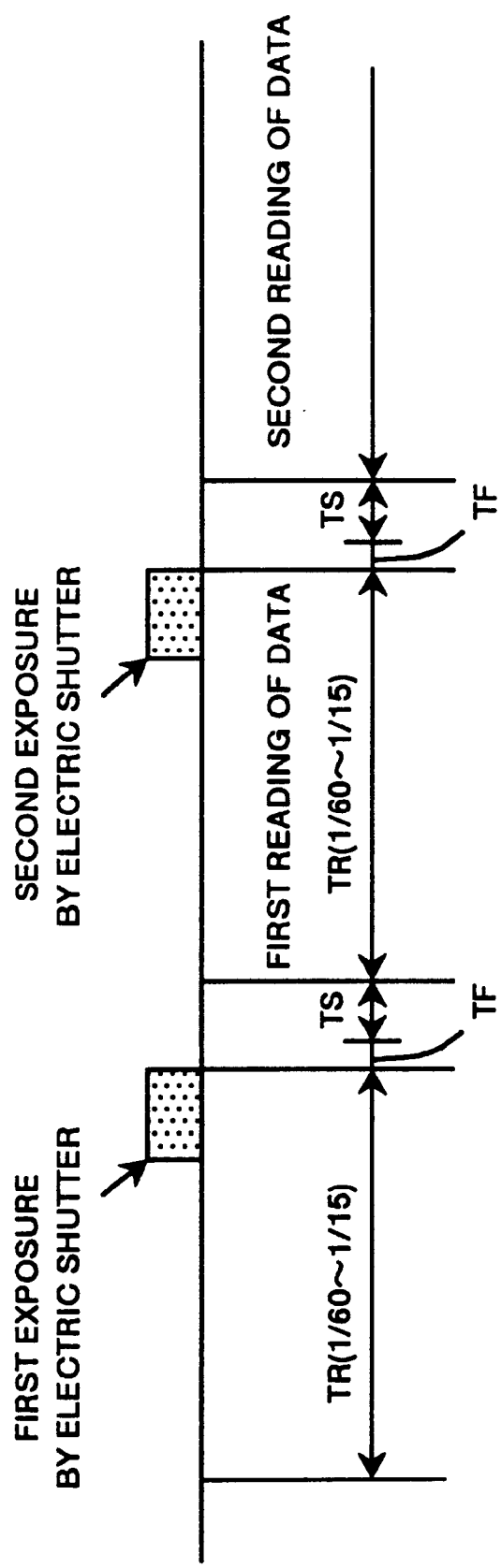
FIG. 13 is a timing chart for explaining timing for pixel shift according to an example based on the conventional technology.
Figure 14:
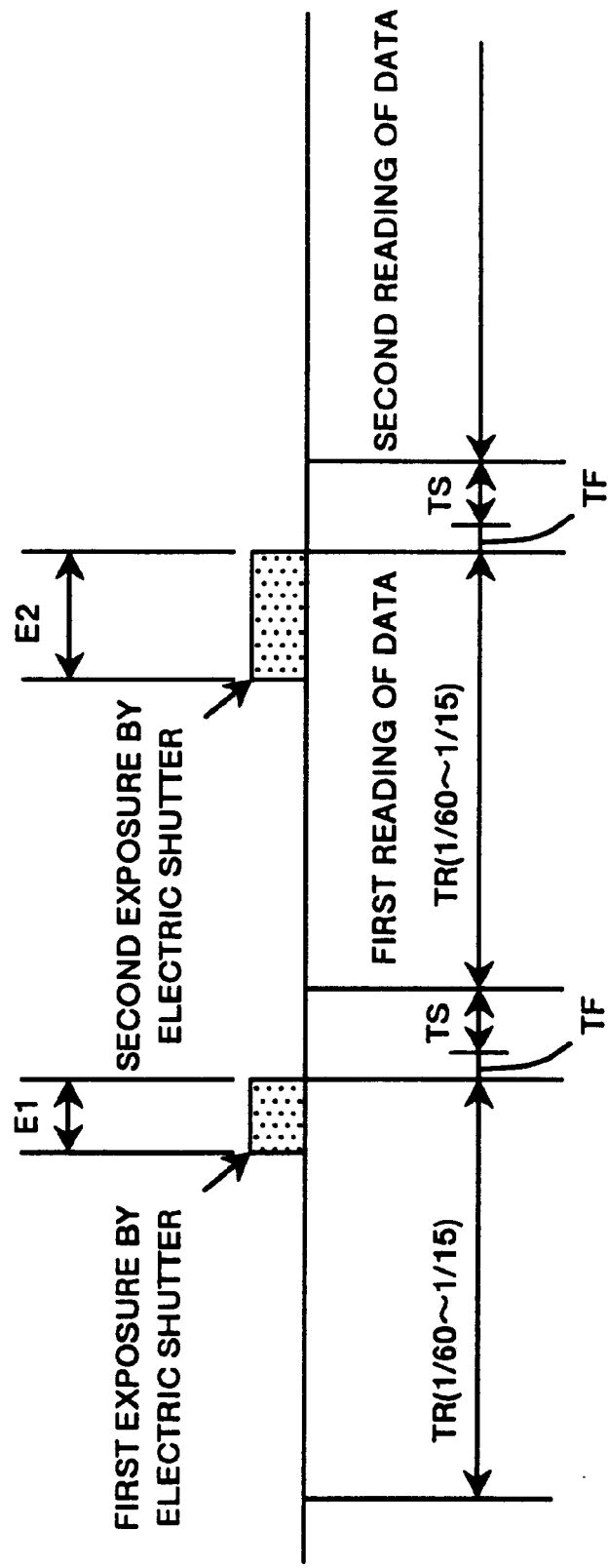
FIG. 14 is a timing chart for explaining the pixel shift and a timing for imaging an object in an enlarged dynamic range according to the example based on the conventional technology.

FIG. 12 is a block diagram showing one embodiment (Embodiment 2) of the image input system according to the present invention. This image input system has the configuration as shown in FIG. 12, in which a digital camera 10 and a computer 11 are connected to each other through a cable (not shown in FIG. 12). It should be noted that, referring to the digital camera 10, in any unit having the same configuration and the same functions as those in the digital camera 1 as described above, the same reference numerals are used for the sections corresponding to those in the digital camera 1, and description thereof is omitted herein.

The digital camera 10 comprises, as units which are common to those used in the digital camera 1, the imaging block 2, A/D converting section 4, and signal generator 5, and also comprises a signal processing block 6 having a different configuration from that in the signal processing block 3 of the digital camera 1.

Namely, the signal processing block 6 comprises components such as a system controller 60, a sensor-data output section 61, and a memory group 62 comprising a plurality of memories, and the circuit configuration of the signal processing block 6 is more simplified as compared to the signal processing block 3 because the pixel shift processing section 33 is not included in the signal processing block 6.

The system controller 60 is connected to each of the units such as the imaging section 21 in the imaging block 2, A/D converting section 4, sensor-data output section 61, memory group 62, and signal generator 5, and controls an operation for imaging, A/D conversion, read/write for the memory, pixel shift and operations according to key-entry or the like.

This system controller 60 comprises a microcomputer or the like, and executes processing for controlling each of the units and computation by actuating the microcomputer according to various programs (for instance, the program as that for making a computer execute processing according to the flowchart shown in FIG. 6 and FIG. 7) previously stored in the ROM.

The sensor-data output section 61 connected to the output terminal of the A/D converting section 4 receives digital image data and also outputs received digital image data to any of the memories in the memory group 62 in the downstream section of the system according to the control provided by the system controller 60.

The memory group 62 has a plurality of memories, uses one memory for each operation for imaging as a storage unit of image data according to the control provided by the system controller 60, reads out digital image data from one of the memories, and supplies the read out data to the external computer 11.

Accordingly, the digital camera 10 does not comprise the pixel shift processing section 33 as is provided in the digital camera 1, and when successive operations for imaging are to be executed, data for a plurality of sheets of digital images of the identical object each in a different imaging range is only stored in the memory group 62. The computer 11 is a personal computer, for example, and has a pixel shift processing section 110 corresponding to the pixel shift processing section 33 described above as a software or a hardware function.

The pixel shift processing section 110 subjects the imaging element to pixel shift processing according to the digital image data received from the digital camera 10 (memory group 62), and more specifically, a high resolution image of the identical object is obtained according to a pixel shift rate (e.g. ½ pixel pitch) when the imaging range is changed by the piezoelectric element 24, and finally image data for one sheet is obtained.

As described above, with Embodiment 2, in the digital camera 10, when the successive operations for imaging are to be executed, the second operation for imaging is controlled at the timing when the first image data obtained in the first operation for imaging is read out from the imaging element 23, and after start of the second operation for imaging, the light-shuttering operation is controlled at the timing earlier than the timing when the second image data obtained in the second operation for imaging is read out from the imaging element 23, while in the computer 11, the first and second image data are received from the digital camera 10 to be synthesized, so that the control of the second operation for imaging is immediately executed at the timing when the image data obtained in the first operation for imaging is read out without any restriction by the timing when image data is read out from the imaging element 23, and at that time, image data for one sheet of image can be obtained on the computer 11 by synthesizing the first and second image data.

As a result, in the digital camera 10, the time intervals between imaging timings are reduced and the successive operations for imaging are executed at a higher speed, so that operations for imaging a dynamic object and also imaging an object by a camera held in photographer's hands can be performed without being restricted by the imaging conditions, while in the computer 11, an image for one sheet is obtained from the synthesis of the plurality of sheets of images obtained by successively imaging the identical object, which makes it possible to obtain a high image quality.

Also, in the digital camera 10, when the successive operations for imaging are to be executed, the operation for changing the imaging range is controlled after the first operation for imaging, while in the computer 11, the first and second image data are received from the digital camera 10 to be synthesized, so that image data for one sheet of image can also be obtained on the computer 11 by synthesizing the first and second image data each with a different imaging range respectively, which makes it possible to obtain high resolution images by using displacement in pitches of pixels.

It should be noted that the Variants 1 to 3 described above are also applicable to this Embodiment 2.

As described above, with the image input device according to the present invention, when successive operations for imaging are to be executed, the second operation for imaging is controlled at the timing when the image data obtained in the first operation for imaging is read out from the imaging element, and after start of the second operation for imaging, the light-shuttering operation is controlled at the timing earlier than the timing when the image data obtained in the second operation for imaging is read out from the imaging element, and the light is shuttered to the imaging element with the optical mechanism, so that the control of the second operation for imaging is immediately executed at the timing when the image data obtained in the first operation for imaging is read out without being restricted by the timing when the image data is read out from the imaging element.

As a result, time intervals between timings for imaging are reduced and successive operations for imaging are speeded up, so that it is possible to obtain an image input device in which an imaging condition is not restricted to an operation for imaging a static object and operations for imaging a dynamic object and also imaging an object by a camera held in a cameraman's hands can be performed.

With the image input device according to the present invention, when successive operations for imaging are to be executed, the operation for changing the imaging range is controlled after the first operation for imaging, the second operation for imaging is controlled at the timing when the image data obtained in the first operation for imaging is read out from the imaging element, and after start of the second operation for imaging, the light-shuttering operation is controlled at the timing earlier than the timing when the image data obtained in the second operation for imaging is read out from the imaging element, and the light is shuttered to the imaging element with the optical mechanism, so that the control of the second operation for imaging is immediately executed at the timing when the image data obtained in the first operation for imaging is read out without any restriction by the timing when the image data is read out from the imaging element, and in that case, a different imaging range between the first and second operations for imaging can be employed.

As a result, the time intervals between imaging timings are reduced and the successive operations for imaging are executed at a higher speed, so that operations for imaging a dynamic object and also imaging an object by a camera held in a photographer's hands can be performed without being restricted by the imaging conditions, and image data for a plurality of pieces of images each in a different imaging range can be obtained by successively imaging the identical object, and for this reason, it is possible to obtain an image input device which is quite effective in a case where a high resolution image is to be obtained by using shift in pixel pitch.

With the image input device according to the present invention, when successive operations for imaging are to be executed, the second operation for imaging is controlled at the timing when the first image data obtained in the first operation for imaging is read out from the imaging element, and after the second operation for imaging, the light-shuttering operation is controlled at the timing earlier than the timing when the second image data obtained in the second operation for imaging is read out from the imaging element, and after the first and second image data are read out and stored at each timing when each of the data is read out respectively, the first and second image data are synthesized, so that the control of the second operation for imaging is immediately executed at the timing when the image data obtained in the first operation for imaging is read out without being restricted by the timing when the image data is read out from the imaging element, and image data for one sheet of image can also be obtained on the device by synthesizing the first and second image data.

As a result, the time intervals between imaging timings are reduced and the successive operations for imaging are executed at a higher speed, so that operations for imaging a dynamic object and also imaging an object by a camera held in a photographer's hands can be performed without being restricted by the imaging conditions, and an image for one sheet is obtained from the synthesis of the plurality of pieces of images obtained by successively imaging the identical object, and for this reason it is possible to obtain an image input device which can provide high resolution images.

With the image input device according to the present invention, when successive operations for imaging are to be executed, the operation for changing the imaging range is controlled after the first operation for imaging, the second operation for imaging is controlled at the timing when the image data obtained in the first operation for imaging is read out from the imaging element, and after start of the second operation for imaging, the light-shuttering operation is controlled at the timing earlier than the timing when the image data obtained in the second operation for imaging is read out from the imaging element, and after the first and second image data are read out and stored at each timing when each of the data is read out respectively, the first and second image data are synthesized, so that the control of the second operation for imaging is immediately executed at the timing when the image data obtained in the first operation for imaging is read out without being restricted by the timing when the image data is read out from the imaging element, and image data for one sheet of image can also be obtained on the device by synthesizing the first and second image data each in a different imaging range.

As a result, the time intervals between imaging timings are reduced and the successive operations for imaging are executed at a higher speed, so that operations for imaging a dynamic object and also imaging an object by a camera held in a photographer's hands can be performed without being restricted by the imaging conditions, and image data for a plurality of sheets of images each in a different imaging range is obtained by successively imaging the identical object, and for this reason it is possible to obtain an image input device which can provide high quality images by making use of shift in pixel pitch.

With the image input device according to the present invention, the changing means has a piezoelectric element and executes pixel shift in the imaging element by changing an imaging range of an object by means of actuating the piezoelectric element, so that the structure can be simplified, and it is possible to obtain an image input device which can provide high resolution images regardless of the imaging condition with any device which is compact and less expensive.

With the image input device according to the present invention, the control means varies an exposure time between the first operation for imaging and second operation for imaging, so that a plurality of sheets of images each having a different exposure volume are obtained by imaging an identical object a plurality of times, and for this reason it is possible to obtain an image input device which can acquire a high quality image with high resolution as well as a widely dynamic range by synthesizing the plurality pieces of image.

With the image input device according to the present invention, the control means has a plurality of modes including a succession mode for executing successive operations for imaging, and makes a determination as to whether the succession mode is to be executed or any other mode is to be executed according to a result of a comparison between an exposure time obtained based on a photometric value by the imaging element and a preset allowable time for shaking of a camera, so that the succession mode is executed if it is determined that the operation for imaging can be executed within the time when shaking of a camera may not occur at the time of imaging, and if it is determined that the operation cannot be executed within the time described above, any other mode can be selected, and with this feature, it is possible to obtain an image input device which can execute an optimal operation for imaging as required according to any situation at the time of imaging.

With the image input system according to the present invention, in the image input device, when successive operations for imaging are to be executed, the second operation for imaging is controlled at the timing when the first image data obtained in the first operation for imaging is read out from the imaging element, and after start of the second operation for imaging, the light-shuttering operation is controlled at the timing earlier than the timing when the second image data obtained in the second operation for imaging is read out from the imaging element, while in the computer, the first and second image data are received from the image input device to be synthesized, so that the control of the second operation for imaging is immediately executed at the timing when the image data obtained in the first operation for imaging is read out without any restriction by the timing when the image data is read out from the imaging element, and image data for one sheet of image can also be obtained on the device by synthesizing the first and second image data.

As a result, in the image input device, the time intervals between imaging timings are reduced and the successive operations for imaging are speeded up, so that operations for imaging a dynamic object and also imaging an object by a camera held in a photographer's hands can be performed without being restricted by the imaging conditions, while in the computer, an image for one sheet is obtained from the synthesis according to the plurality of sheets of images obtained by successively imaging the identical object, and for this reason it is possible to obtain an image input system which can provide high resolution images.

With the image input system according to the present invention, in the image input device, when successive operations for imaging are to be executed, the operation for changing the imaging range is controlled after the first operation for imaging, the second operation for imaging is controlled at the timing when the image data obtained in the first operation for imaging is read out from the imaging element, and after start of the second operation for imaging, the light-shuttering operation is controlled at the timing earlier than the timing when the image data obtained in the second operation for imaging is read out from the imaging element, and the light is shuttered to the imaging element with the optical mechanism, while in the computer, the first and second image data are received from the image input device to be synthesized, so that the control of the second operation for imaging is immediately executed at the timing when the image data obtained in the first operation for imaging is read out without being restricted by the timing when the image data is read out from the imaging element, and image data for one sheet of image can also be obtained on the device by synthesizing the first and second image data each in a different imaging range.

As a result, in the image input device, the time intervals between imaging timings are reduced and the successive operations for imaging are executed at a higher speed, so that operations for imaging a dynamic object and also imaging an object by a camera held in a photographer's hands can be performed without any restriction of the imaging conditions, while in the computer, an image for one sheet is obtained by means of synthesis according to images each in a different imaging range obtained by successively imaging the identical object, and for this reason it is possible to obtain an image input system which can provide high resolution images by making use of shift in pixel pitch.

With the image input system according to the present invention, the changing means has a piezoelectric element and executes pixel shift in the imaging element by changing an imaging range of an object by means of actuating the piezoelectric element, so that the structure can be simplified, and it is possible to obtain an image input system which can provide high resolution images regardless of imaging condition with any device which is compact and less expensive.

With the image input system according to the present invention, the control means varies an exposure time between the first operation for imaging and second operation for imaging, so that a plurality of sheets of images each having a different exposure volume are obtained by imaging the identical object several times, and for this reason it is possible to obtain an image input system which can provide a high resolution image with high resolution as well as a widely dynamic range by synthesizing the plurality sheets of image.

With the image input system according to the present invention, the control means has a plurality of modes including a succession mode for executing successive operations for imaging, and makes a determination as to whether the succession mode is to be executed or any other mode is to be executed according to a result of a comparison between an exposure time obtained based on a photometric value by the imaging element and a preset allowable time for shaking of a camera, so that the succession mode is executed if it is determined that the operation for imaging can be executed within the time when shaking of a camera may not occur at the time of imaging, and if it is determined that the operation cannot be executed within the time described above, any other mode can be selected, and with this feature, it is possible to obtain an image input system which can execute an optimal operation for imaging as required according to any condition at the time of imaging.

This application is based on Japanese patent application No. HEI 8-271133 filed in the Japanese Patent Office on Oct. 14, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image input device for executing successive operations for imaging comprising:
   an imaging element for imaging an object to obtain image data for the object for a certain number of pixels;
   a read out signal generator for generating a read out signal to electrically read out image data from said imaging element;
   a light-shutter for forming a light-shuttered state to said imaging element with an optical mechanism; and
   a controller for controlling a first and second exposure time for successive first and second of said successive imaging operations, wherein said first exposure time for said first imaging operation is ended by electrically reading out image data from said imaging element when said light-shutter is not in the light shuttered state, and said second exposure time for said second imaging operation is ended by switching said light shutter to the light shuttered state.

2. An image input device according to claim 1; wherein said controller has a plurality of modes including a succession mode for executing said successive operations for imaging, and makes determination as to whether said succession mode is to be executed or any one of said plurality modes excluding said succession mode is to be executed according to a result of comparison between an exposure time obtained based on a photometric value by said imaging element and a preset allowable time in consideration for shaking of a camera.

3. An image input device for executing successive operations for imaging comprising:

an imaging element for imaging an object to obtain image data for a certain number of pixels;

a read out signal generator for generating a read out signal to electrically read out image data from said imaging element;

a changing unit for changing an imaging range for the object to be imaged by said imaging element;

a light-shutter for forming a light-shuttered state to said imaging element with an optical mechanism; and a controller for controlling a first and second exposure time for successive first and second of said successive imaging operations, wherein said first exposure time for said first imaging operation is ended by electrically reading out image data from said imaging element when said light-shutter is not in the light shuttered state, and said second exposure time for said second imaging operation is ended by switching said light shutter to the light shuttered state.

4. An image input device according to claim 3; wherein said changing unit has a piezoelectric element and executes pixel shift in said imaging element by changing an imaging range of an object by means of actuating said piezoelectric element.

5. An image input device according to claim 3; wherein said controller has a plurality of modes including a succession mode for executing said successive operations for imaging, and makes determination as to whether said succession mode is to be executed or any one of said plurality modes excluding said succession mode is to be executed according to a result of comparison between an exposure time obtained based on a photometric value by said imaging element and a preset allowable time in consideration for shaking of a camera.

6. An image input device for executing successive operations for imaging comprising:

an imaging element for imaging an object to obtain image data for a certain number of pixels;

a read out signal generator for generating a read out signal to electrically read out image data from said imaging element;

a memory for storing therein image data readout from said imaging element;

a light-shutter for forming a light-shuttered state to said imaging element with an optical mechanism;

a controller for controlling a first and second exposure time for successive first and second of said successive imaging operations, wherein said first exposure time for said first imaging operation is ended by electrically reading out image data from said imaging element when said light-shutter is not in the light shuttered state, and said second exposure time for said second imaging operation is ended by switching said light shutter to the light shuttered state; and an image synthesizer for synthesizing the first and second image data read out under controls by said controller from said imaging element and stored in said memory.

7. An image input device according to claim 6; wherein said controller varies an exposure time between said first operation for imaging and second operation for imaging.

8. An image input device according to claim 6; wherein said controller has a plurality of modes including a succession mode for executing said successive operations for imaging, and makes determination as to whether said succession mode is to be executed or any one of said plurality modes excluding said succession mode is to be executed according to a result of comparison between an exposure time obtained based on a photometric value by said imaging element and a preset allowable time in consideration for shaking of a camera.

9. An image input device for executing successive operations for imaging comprising:

an imaging means for imaging an object to obtain image data for a certain number of pixels;

a read out signal generator for generating a read out signal to electrically read out image data from said imaging element;

a changing unit for changing an imaging range of an object to be imaged by said imaging element;

a memory for storing therein image data read out from said imaging element;

a light-shutter for forming a light-shuttered state to said imaging element with an optical mechanism;

a controller for controlling a first and second exposure time for successive first and second of said successive imaging operations, wherein said first exposure time for said first imaging operation is ended by electrically reading out image data from said imaging element when said light-shutter is not in the light shuttered state, and said second exposure time for said second imaging operation is ended by switching said light shutter to the light shuttered state; and an image synthesizer for synthesizing the first and second image data read out from said imaging element under controls by said controller and stored in said memory.

10. An image input device according to claim 9; wherein said changing unit has a piezoelectric element and executes pixel shift in said imaging element by changing an imaging range of an object by means of actuating said piezoelectric element.

11. An image input device according to claim 9; wherein said controller varies an exposure time between said first operation for imaging and second operation for imaging.

12. An image input device according to claim 9; wherein said controller has a plurality of modes including a succession mode for executing said successive operations for imaging, and makes determination as to whether said succession mode is to be executed or any one of said plurality modes excluding said succession mode is to be executed according to a result of comparison between an exposure time obtained based on a photometric value by said imaging element and a preset allowable time in consideration for shaking of a camera.

13. An image input system comprising:

an image input device for executing successive operations for imaging; and a computer connected to said image input device for processing image data through communications with said image input device; wherein said image input device comprises:

an imaging element for imaging an object to obtain image data for a certain number of pixels;

a read out signal generator for generating a read out signal to electrically read out image data from said imaging element;

a memory for storing therein image data readout from said imaging element;

a light-shutter for forming a light-shuttered state to said imaging element with an optical mechanism; and a controller for controlling a first and second exposure time for successive first and second of said successive imaging operations, wherein said first exposure time for said first imaging operation is ended by electrically reading out image data from said imaging element when said light-shutter is not in the light shuttered state, and said second exposure time for said second imaging operation is ended by switching said light shutter to the light shuttered state;

and said computer comprises:

a receiver for receiving the first and second image data stored in said memory through communications with said image input device; and an image synthesizer for synthesizing the first and second image data received by said receiver.

14. An image input system according to claim 13; wherein said controller varies an exposure time between said first operation for imaging and second operation for imaging.

15. An image input system according to claim 13; wherein said controller has a plurality of modes including a succession mode for executing said successive operations for imaging, and makes determination as to whether said succession mode is to be executed or any one of said plurality modes excluding said succession mode is to be executed according to a result of comparison between an exposure time obtained based on a photometric value by said imaging element and a preset allowable time for shaking of a camera.

16. An image input system comprising:

an image input device for executing successive operations for imaging; and a computer connected to said image input device for processing image data through communications with said image input device; wherein said image input device comprises:

an imaging element for imaging an object to obtain image data for a certain number of pixels;

a read out signal generator for generating a read out signal to electrically read out image data from said imaging element;

a changing unit for changing an imaging range of an object to be imaged by said imaging element;

a memory for storing therein image data read out from said imaging element;

a light-shutter for forming a light-shuttered state to said imaging element with an optical mechanism; and a controller for controlling a first and second exposure time for successive first and second of said successive imaging operations, wherein said first exposure time for said first imaging operation is ended by electrically reading out image data from said imaging element when said light-shutter is not in the light shuttered state, and said second exposure time for said second imaging operation is ended by switching said light shutter to the light shuttered state; and said computer comprises:

a receiver for receiving the first and second image data stored in said memory through communications with said image input device; and an image synthesizer for synthesizing the first and second image data received by said receiver.

17. An image input system according to claim 16; wherein said changing unit has a piezoelectric element and executes pixel shift in said imaging element by changing an imaging range of an object by means of actuating said piezoelectric element.

18. An image input system according to claim 16; wherein said controller varies an exposure time between said first operation for imaging and second operation for imaging.

19. An image input system according to claim 16; wherein said controller has a plurality of modes including a succession mode for executing said successive operations for imaging, and makes determination as to whether said succession mode is to be executed or any one of said plurality modes excluding said succession mode is to be executed according to a result of comparison between an exposure time obtained based on a photometric value by said imaging element and a preset allowable time for shaking of a camera.

* * * * *